United States Patent
Yu

(10) Patent No.: US 6,406,311 B1
(45) Date of Patent: Jun. 18, 2002

(54) EJECTOR MECHANISM FOR AN ELECTRICAL CARD CONNECTOR

(75) Inventor: Hung-Chi Yu, Hsi-Chih (TW)

(73) Assignee: Ion Hai Precision Ind. Co. Ltd., Taipei Hsien (TW)

( * ) Notice: Subject to any disclaimer, the term of this patent is extended or adjusted under 35 U.S.C. 154(b) by 0 days.

(21) Appl. No.: 09/879,628

(22) Filed: Jun. 11, 2001

(30) Foreign Application Priority Data

Feb. 27, 2001 (TW) .......................................... 090202955

(51) Int. Cl.⁷ ............................................. H01R 13/62
(52) U.S. Cl. ...................................................... 439/159
(58) Field of Search ................................ 439/159, 160, 439/152–158

(56) References Cited

U.S. PATENT DOCUMENTS

| | | | | |
|---|---|---|---|---|
| 5,653,603 A | * | 8/1997 | Sasao et al. ................. | 439/159 |
| 5,997,325 A | * | 12/1999 | Hara ........................... | 439/159 |
| 6,174,181 B1 | * | 1/2000 | Lai ............................. | 439/159 |
| 6,022,228 A | * | 2/2000 | Kuo ............................ | 439/159 |
| 6,071,134 A | * | 6/2000 | Tung .......................... | 439/159 |
| 6,139,340 A | * | 10/2000 | Niitsu ........................ | 439/159 |
| 6,146,164 A | * | 11/2000 | Tung .......................... | 439/159 |
| 6,152,748 A | * | 11/2000 | Sato et al. .................. | 439/159 |
| 6,162,075 A | * | 12/2000 | Hara et al. .................. | 439/159 |
| 6,176,714 B1 | * | 1/2001 | Ishida et al. ................ | 439/159 |

* cited by examiner

Primary Examiner—Gary F. Paumen
(74) Attorney, Agent, or Firm—Wei Te Chung

(57) ABSTRACT

An ejector mechanism comprises an ejector (1) for releasing an electrical card from an electrical card connector (5) and a push mechanism (2) for engaging with the ejector. The push mechanism comprises a plate (14) defining a guiding groove (141), a push bar (12), a slider (11), a spring (10) assembled between the push bar and the plate and a case (15) for retaining the plate and the push bar together. The push bar is slidable with respect to the plate and comprises a pusher (122) with a recess (120) and a locker (121) movably assembled on an end of the pusher. The locker is capable of being operating when in a free position and is prevented from being operated when in a locked position. The slider is movably mounted to the push bar within the recess and comprises a guiding pin (112) to be engaged in the guiding groove.

1 Claim, 6 Drawing Sheets

EJECTOR MECHANISM FOR AN ELECTRICAL CARD CONNECTOR

BACKGROUND OF THE INVENTION

1. Field of the Invention

The present invention relates to an ejector mechanism for an electrical card connector, and particularly to an ejector mechanism with anti-mishandling means.

2. Description of Related Art

Notebook computers are widely used for small volume and convenience for carrying. The limited space inside a notebook computer cannot accommodate too many devices and components, so the notebook computer is usually equipped with an electrical card connector for mating with various cards, such as a memory card, an extended memory card and a hard disk, etc. However, each card mentioned above is inserted into the notebook computer fully or almost fully, so a large force is required to pull it out. In addition, the card extends only a very little portion outside the notebook computer; such makes it difficult to manually grasp the card and release it out of the notebook computer. To ease the releasing of a card, an electrical card connector is designed with an ejector mechanism for ejecting the card out of the notebook computer. Taiwan Patent Application No. 83215629 discloses a one-step ejector mechanism which ejects a card from a notebook computer by being pushed forward from an original position in one step and is pushed back to the original position when the card is inserted into the notebook computer. However, the ejector mechanism has a long tail extending outside the notebook computer in the original position, so the card willinadvertently be released by mishandling or the tail will be broken by improper external force. A twostep ejector mechanism disclosed in Taiwan Patent Application No. 83111731 avoids the problem mentioned above The ejector mechanism ejects a card out of a notebook in two steps, i.e., a releasing step and a restoring step. The ejector mechanism is mostly received in the notebook computer after the releasing step, so it will not be broken by improper external fore in this position. In addition, the ejector mechanism isconvenient for manipulating, so it is widely used in the notebook computers. However, when the twostep ejector mechanism is subjected to an improper external force after the restoring step, it will inadvertently eject the card out of the notebook computer thereby preventing the notebook computer from working properly.

Therefore, an improved ejector mechanism for an electrical card connector is required to overcome the disadvantages of the conventional ejector mechanism.

SUMMARY OF THE INVENTION

Accordingly, the object of the present invention is to provide an ejector mechanism for an electrical card connector which can prevent a card from being ejected improperly.

In order to achieve the object set forth, an ejector mechanism for an electrical card connector comprises an ejector for releasing an electrical card from the electrical card connector and a push mechanism for pushing the ejector to move between an original position and a stopped position. The push mechanism comprises a plate, a push bar, a slider, a spring assembled between the push bar and the plate, and a case for retaining the plate and the push bar together. The plate defines a guiding groove on a surface thereof. The slider is movably mounted to the push bar. The slider comprises a guiding pin biased in a front portion to be engaged in the guiding groove of the plate. The push bar is operable to be slidable with respect to the plate and comprises a push c with a recess in the middle thereof for receiving the slider and a locker movably assembled on an end of the pusher. The locker is capable of being operated when in a free position and is prevented from being operated when in a locked position.

Other objects, advantages and novel features of the invention will become more apparent from the following detailed description when taken in conjunction with the accompanying drawings.

DETAILED DESCRIPTION OF THE INVENTION

Figure 1:
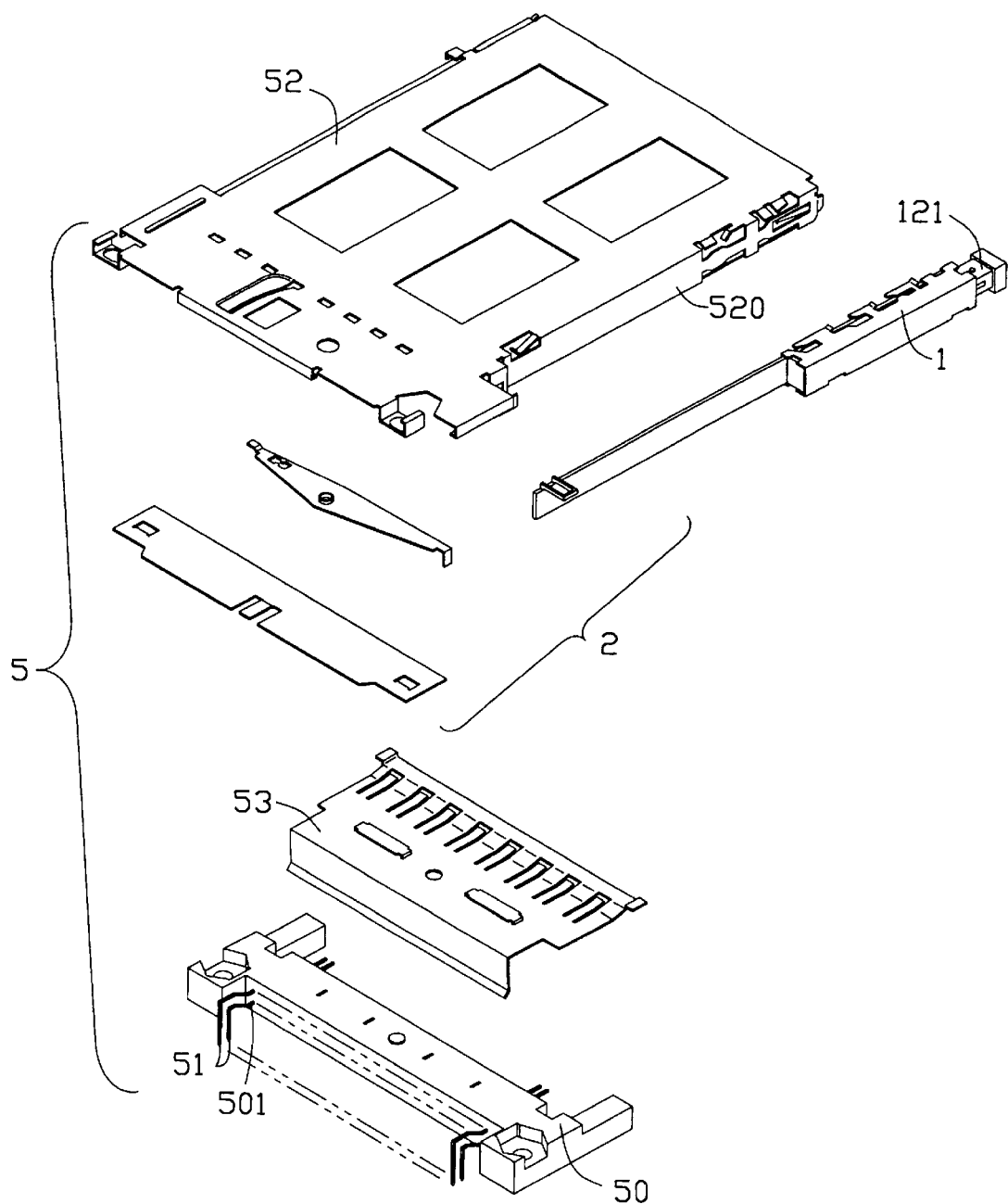
FIG. 1 is an exploded perspective view of an electrical card connector.

Reference will now be made to the drawing figures to describe the present invention in detail.

Referring to FIG. 1, an ejector mechanism of the present invention is used with an electrical card connector 5, for use with a memory or an I/O card as shown in U.S. Pat. No. 5,413,490, which comprises an insulative housing 50, a plurality of terminals 51, a shield 52 and a grounding plate 53.

The insulative housing 50 comprises a plurality of receiving passageways 501 for receiving corresponding terminals 51. The shield 52 encloses the insulative housing 50 and comprises a pair of sidewalls 520 extending downwardly from each transverse edge thereof The grounding plate 53 is assembled between the insulative housing 50 and the shield 52 for grounding.

The ejector mechanism is assembled on one of the sidewalls 520 of the shield 52 and comprises an ejector 2 for ejecting an electrical card (not shown) thereof and a push mechanism 1 for engaging with the ejector 2.

Figure 2:
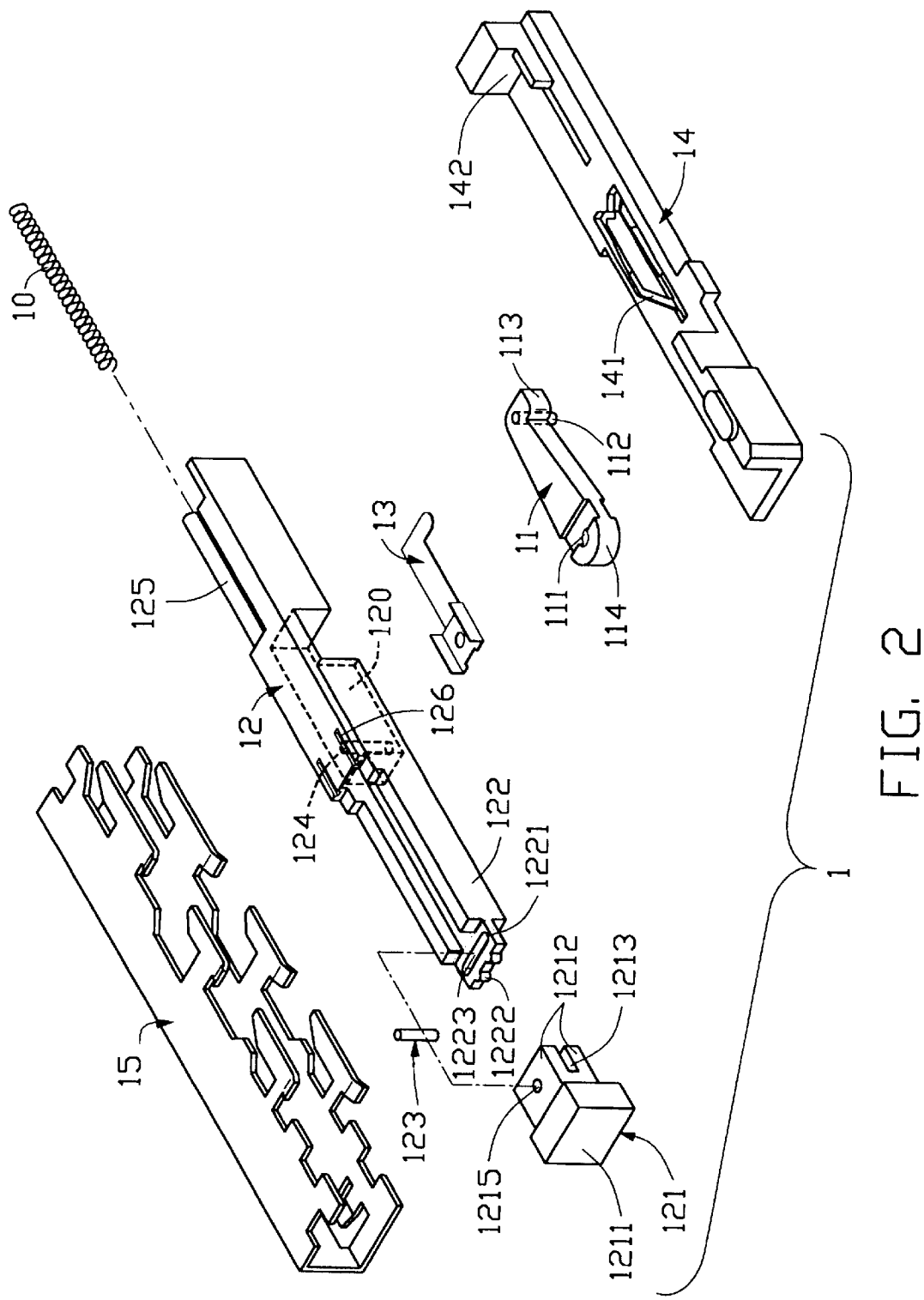
FIG. 2 is an exploded perspective view of a push mechanism of FIG. 1.

Referring to FIG. 2, the push mechanism 1 includes a plate 14 defining a guiding groove 141 on a surface thereof, a push bar 12, a leaf spring 13, a slider 11 and a case 15. The plate 14 comprises a block 142 on an end thereof.

The slider 11 is movable along the guiding groove 141 and comprises a front portion 113 and a hole 111 through the slider 11 proximate a rear end thereof. A guiding pin 112 extends downwardly from a lower face proximate the front portion 113. The leaf spring 13 defines a through hole 131 on a rear end thereof.

Figures 7A, 7B:
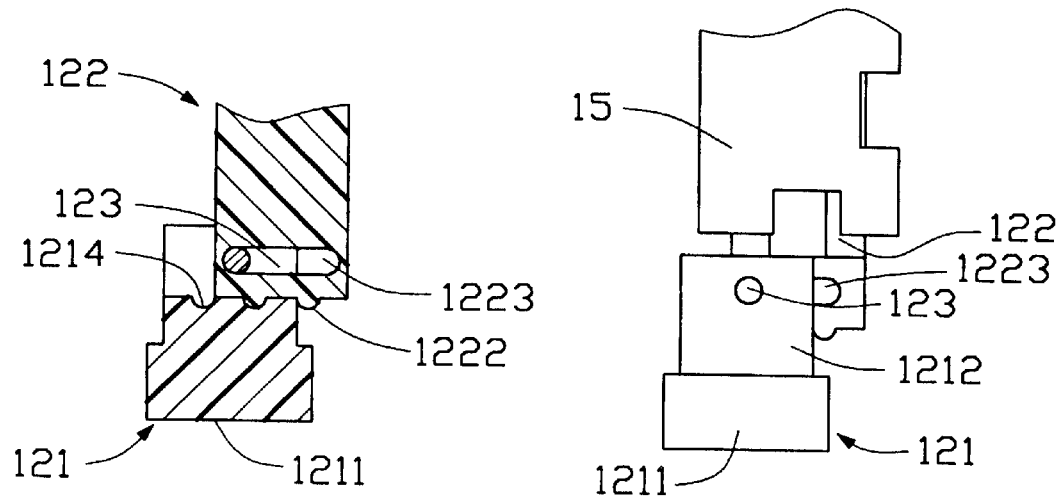
FIG. 7A is a cross-sectional view of the locker and the pusher wherein the locker is in a locked position.
FIG. 7B is a bottom view of the locker and the pusher wherein the locker is in the locked position.

The push bar 12 comprises a pusher 122, a locker 121 assembled on a rear end of the pusher 122 and a peg 123 for connecting the locker 121 and the pusher 122 together. The pusher 122 defines a recess 120 substantially in a middle portion thereof for receiving the leaf spring 13 and the slider 11. A dowel 124 extends downwardly from an upper face of the recess 120. The pusher 122 comprises a bulge 1221 on a rear end and a pole 125 extending from a front end thereof for retaining the spring 10 therein. The bulge 1221 comprises a pair of projections 1222 extending rearwardly from a rear end thereof and an elongate through hole 1223 proximate the rear end thereof for receiving the peg 123. The locker 121 comprises a rectangular header 1211 and a pair of parallel walls 1212 extending forwardly from a front end thereof which defines a channel 1213 for receiving the bulge 1221. Both the walls 1212 define a through hole 1215 in vertical alignment with the elongate hole 1223 for receiving the peg 123. The locker defines a pair of concavities 1214 on a bottom wall of the channel 1213 for receiving the projections 1222, referring to FIG. 7A.

Figure 3:
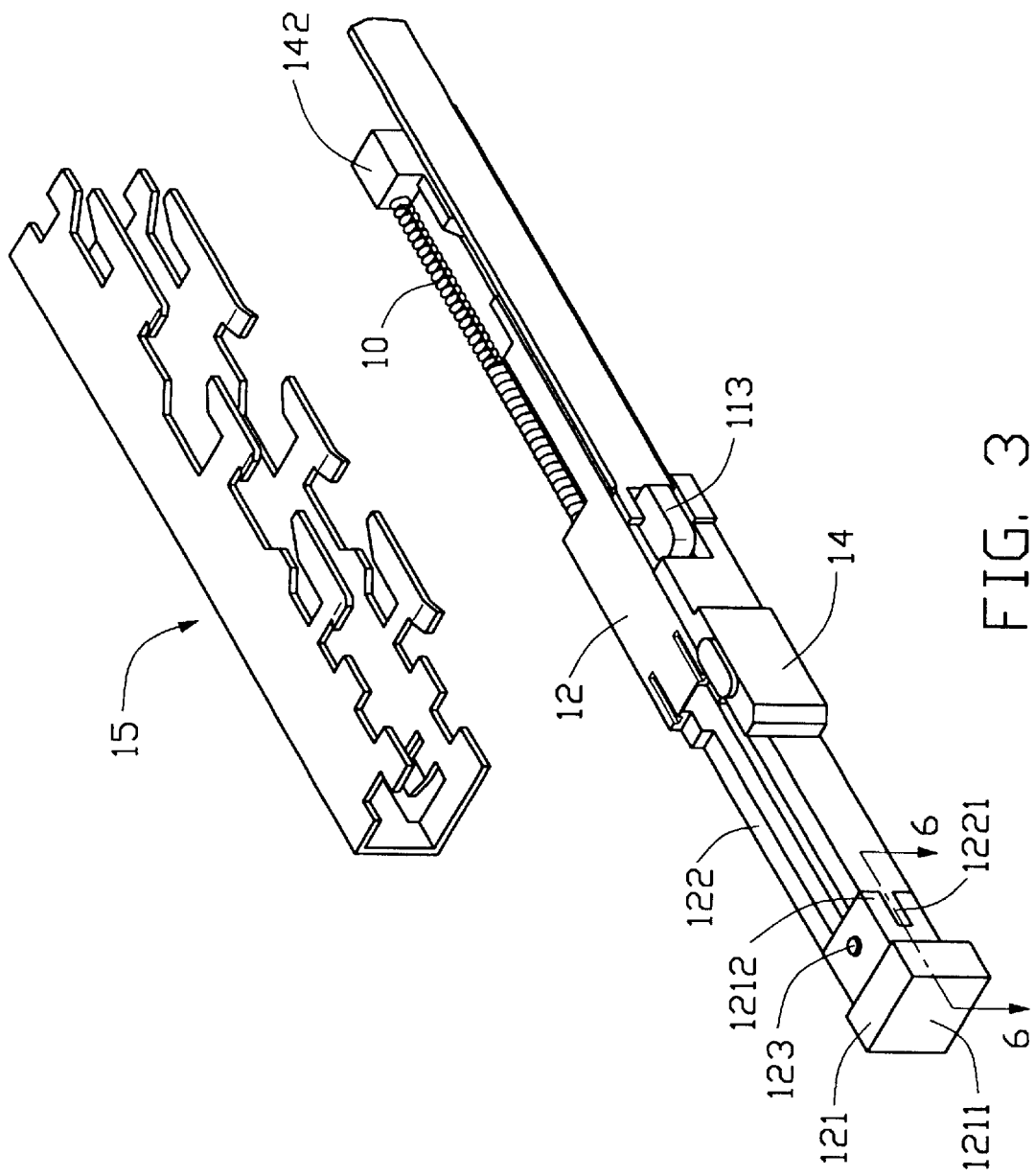
FIG. 3 is a perspective view of the partially assembled push mechanism of FIG. 2.
Figure 5A:
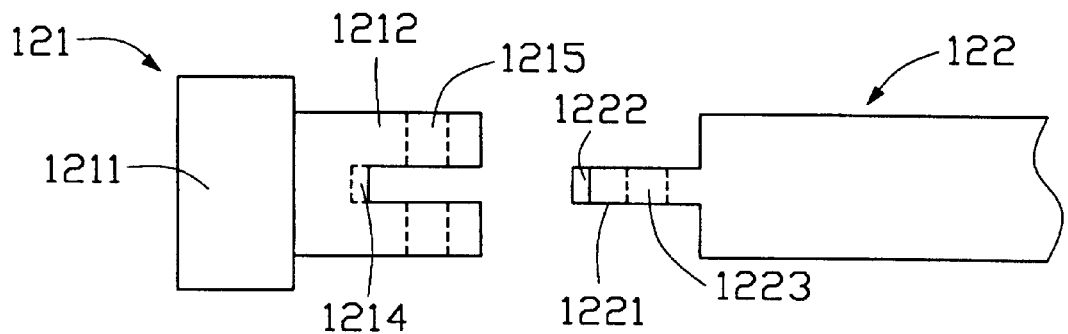
FIG. 5A and 5B are schematic plan views of the assembly of a locker and a pusher of FIG. 1.
Figure 5B:
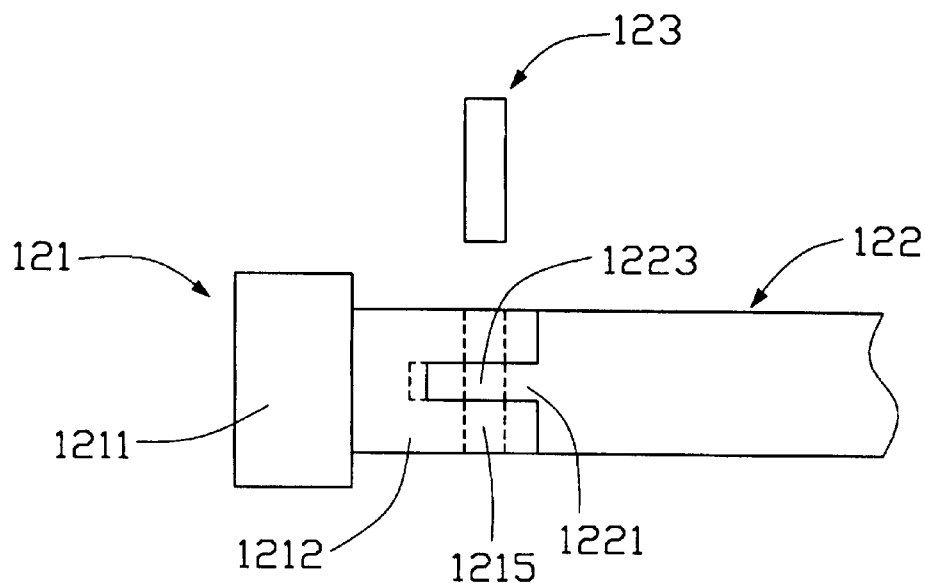
Figures 6A, 6B:
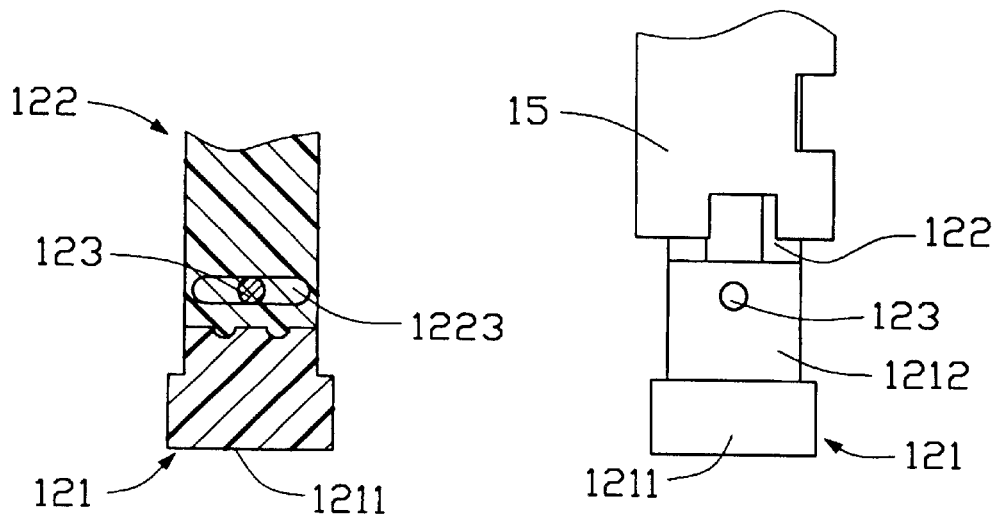
FIG. 6A is a cross-sectional view of the locker and the pusher taken along line 6—6 in FIG. 3 wherein the locker is in a free position.
FIG. 6B is a bottom view of the locker and the pusher wherein the locker is in the free position.

In assembly, referring to FIGS. 3, 5A and 5B, the leaf spring 13 and the slider 11 are placed in the recess 120 of the push bar 12 with the dowel 124 received in the holes 111, 131. The locker 121 is assembled on the bulge 1221 of the pusher 122 by the peg 123 being received in the through hole 1215 of the locker 121 and the elongate hole 1223 of the pusher 122. The spring 10 is mounted on the pole 125 of the push bar 12. The assembled push bar 12 is assembled on the plate 14 with the pin 112 received in the guiding groove 141 and the spring 10 pressing against the block 142 of the plate 14. The assembled push bar 12 and the plate 14 are assembled in the case 15. The case 15 finally is assembled on one sidewall 520 of the shield 52.

Figure 4:
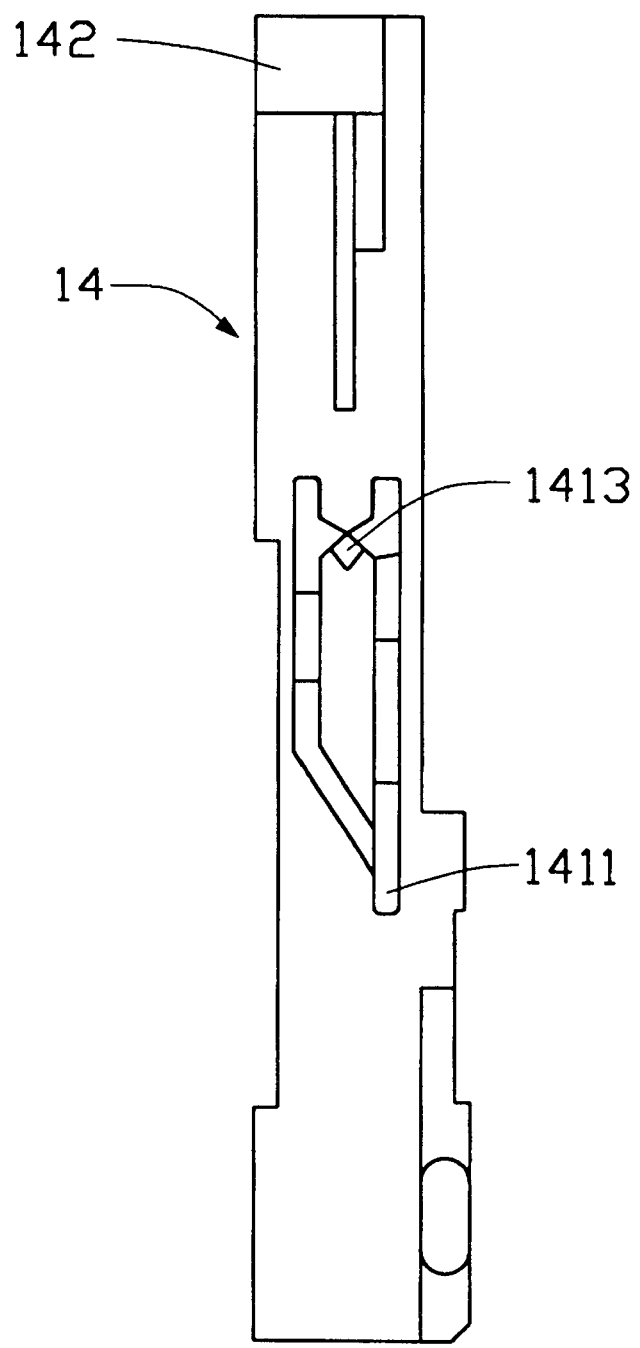
FIG. 4 is a bottom view of a plate of FIG. 1.

Referring to FIG. 4, when the guiding pin 112 of the slider 11 is positioned at a stopping section 1413 of the guiding groove 141 of the plate 14, (i.e., the inner position relative to the guiding groove), a force exerted on the locker 121 of the pushed bar 11 causes the push bar 11 to move toward the block 142 of the plate 14. When the force is removed, the spring 10 urges the push bar 12 to move away from the block 12 of the plate 1 and the guiding pin 112 restores to an original position 1411.

Referring to FIGS. 6A, 6B, 7A and 7B, when the locker is in a free position where both the projections 1222 of the pusher 122 are received in corresponding concavities 1214, the locker 121 can be pushed forwardly without being blocked. While the locker 121 is pushed sidewardly with the peg 123 moving along the elongate hole 1223 to be in a locked position, the locker 121 is blocked by the case 15 from moving forwardly and cannot be pushed forwardly, therefore, the ejector mechanism is protected from ejecting the electrical card improperly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the locker 121 can be blocked by the plate 14 instead of the case 15 if the dimensions of the corresponding parts are properly arranged. The locker may be rotatable relative to the pusher instead of the lateral movement to form the lateral abutment thereof for engagement with the case.

What is claimed is:

1. An ejector mechanism for an electrical card connector receiving an electrical card, comprising:

an ejector for releasing the electrical card from the electrical card connector; and a push mechanism for pushing the sector to move between an original position and a stopped position, comprising:

a plate defining a guiding groove on a surface thereof;

a push bar operable to be slidable with respect to the plate and comprising a pusher and a locker movably assembled on a end of the pusher, the pusher defining a recess;

a slider being movably mounted within the recess of the pusher, and having a guiding pin engaged in the guiding groove of the plate;

a spring assembled between the pusher and the slider; and a case for retaining the plate and the push bar together;

wherein the locker when in free position is free to be pushed forward and when sidewardly moved to a locked position is blocked by the case from moving forward;

wherein the pusher comprises a bulge on a rear end thereof and the locker comprises a pair of upper and lower walls which define a channel for receiving the bulge;

wherein the pusher bar comprises a peg for connecting the pusher and the locker together, the bulge of the pusher defines an elongate hole, and each wall of the locker defines a circular hole for receiving the peg;

wherein the pusher comprises a pair of projections on a rear end thereof and the locker defines a pair of concavities on a bottom wall of the channel for receiving the corresponding projections.

* * * * *